United States Patent
Hatten

(10) Patent No.: US 8,376,254 B2
(45) Date of Patent: Feb. 19, 2013

(54) WATER TREATMENT SYSTEMS AND METHODS

(75) Inventor: Paul Hatten, Carlsbad, CA (US)

(73) Assignee: Anue Water Technologies, Inc., Vista, CA (US)

( * ) Notice: Subject to any disclaimer, the term of this patent is extended or adjusted under 35 U.S.C. 154(b) by 301 days.

(21) Appl. No.: 12/828,182

(22) Filed: Jun. 30, 2010

(65) Prior Publication Data

US 2010/0327095 A1 Dec. 30, 2010

Related U.S. Application Data

(60) Provisional application No. 61/222,066, filed on Jun. 30, 2009, provisional application No. 61/222,070, filed on Jun. 30, 2009, provisional application No. 61/244,840, filed on Sep. 22, 2009.

(51) Int. Cl.
*B02C 23/36* (2006.01)
(52) U.S. Cl. .................................. 241/46.017; 166/223
(58) Field of Classification Search ............ 241/46.017; 166/223; 261/36.1; 134/167 R, 168 R, 169 R, 134/167 C, 180

See application file for complete search history.

(56) References Cited

U.S. PATENT DOCUMENTS

| 4,064,047 | A | 12/1977 | Bernreiter et al. |
| 5,038,810 | A | 8/1991 | Pacheco et al. |
| 5,147,530 | A | 9/1992 | Chandler et al. |
| 5,350,543 | A | 9/1994 | Spradley |
| 6,868,857 | B2 | 3/2005 | McCasker |
| 7,082,952 | B1 | 8/2006 | McCasker et al. |
| 2003/0072213 | A1 | 4/2003 | Cocoli |

FOREIGN PATENT DOCUMENTS

| AU | 39856/93 | 12/1994 |
| WO | WO 97/47933 A1 | 12/1997 |
| WO | WO 01/58605 | 8/2001 |
| WO | WO 2005-035447 A2 | 4/2005 |
| WO | WO 2008/014559 | 2/2008 |

OTHER PUBLICATIONS

PCT/US2010/040683 PCT International Search Report, PCT/ISA/210, Feb. 10, 2011, pp. 1-3.
PCT/US2010/049881; PCT International Search Report, PCT/ISA/210, Jun. 27, 2011, pp. 1-3.

*Primary Examiner* — Mark Rosenbaum
(74) *Attorney, Agent, or Firm* — Anthony G. Smyth

(57) ABSTRACT

Systems, apparatus and methods are described that can be used for cleaning wells using unfiltered fluids and fluids that contain solid matter. A spray head assembly mounted in a pumping station comprises a hydrodynamic mixing chamber configured to create turbulence in a fluid received from a pump. The pump draws a fluid from a well of the pumping station and provides a pressurized stream of the fluid to a pipe. A nozzle associated with an outlet of the mixing chamber, receives the mixed fluid from the hydrodynamic mixing chamber and the nozzle disperses the mixed fluid to the surface of a body of the fluid in the well.

18 Claims, 10 Drawing Sheets

EP-300 SERIES SYSTEM REQUIREMENTS AND SPECIFICATIONS

| System Overview | | EP-315 | EP-315-Pxxx (See Pump Systems, below) | EP-320 | EP-320-Pxxx (See Pump Systems, below) |
|---|---|---|---|---|---|
| Single Output System, Patent Pending | | 1.5" (38 mm) | 1.5" (38 mm) | 2.0" (51 mm) | 2.0" (51 mm) |
| Head Assembly, Composite Head, Sealed Rotary Bearing Assembly, 316 Stainless Steel | | EP-HA315 | EP-HA315 | EP-HA320 | EP-HA320 |
| Mounting Bracket, Dual Camlock, Safety Rod, 316 Stainless Steel | | EP-MB1315 | EP-MB1315 (2) | EP-MB1320 | EP-MB1320 (2) |
| Feed Mast, NPT thread, Lifting Handle, 1" Liquid Injection Port/Bolt | | EP-FM1315 | EP-FM1315 (2) | EP-FM1320 | EP-FM1320 (2) |
| Pump, Centrifugal Grinder, 2 or 5 hp (see below) | | None | 1 | None | 1 |
| Control Panel & Timer (see below) | | None | 1 | None | 1 |
| Wastewater Application | | Single discharge main tap | Self-contained system with pump and control | Single or dual discharge main tap | Self-contained system with pump and control |
| System Operating Requirements | | EP-315 | EP-315-Pxxx (See Pump Systems, below) | EP-320 | EP-320-Pxxx (See Pump Systems, below) |
| Flow: gallons / minute at ≥ 4 psi, 25 rpm | 1 gpm = 3.8 lpm | 52 gpm | 52 gpm | 76 gpm | 76 gpm |
| Flow: gallons / minute at ≥ 4 psi, 18 rpm | 1 gpm = 3.8 lpm | 51 gpm | 51 gpm | 74 gpm | 74 gpm |
| Rotational Speed Range | | 18 to 25 rpm | 18 to 25 rpm | 18 to 25 rpm | 18 to 25 rpm |
| Pump Horsepower | *Pump part of system | ≥ 5 hp | 2 hp* | ≥ 10 hp | 5 hp* |
| Pump Run Time Minimum per Day | | ≥ 5% | ≥ 5% | ≥ 5% | ≥ 5% |
| Discharge Main Diameter | 1 inches = 25.4 mm | ≥ 4 inches | Not Applicable | ≥ 8 inches | Not Applicable |
| Optimum / Minimum Position above High Float | 1 foot = 0.31M | 4 feet / 1 foot | 4 feet / 1 foot | 4 feet / 1 foot | 4 feet / 1 foot |
| Wet Well Minimum Diameter Required | (feet) | ≥ 4 feet | ≥ 4 feet | ≥ 4 feet | ≥ 4 feet |
| Specifications Pump Systems | | EP-315-P221 | EP-315-P223 | EP-320-P521 | EP-320-P523 |
| Pump, Control-Timer Part Number | | AGP-221 | ACP-223 | ACP-521 | ACP-523 |
| Centrifugal Grinder Pump- Horsepower | | 2 hp | 2 hp | 5 hp | 5 hp |
| Input Voltage, Phase | | 208-220 VAC, 1Ø | 230 VAC, 3Ø | 208-220 VAC, 1Ø | 230 VAC, 3Ø |

Figure 9

WATER TREATMENT SYSTEMS AND METHODS

CROSS-REFERENCE TO RELATED APPLICATIONS

The present Application claims priority from U.S. Provisional Patent Application No. 61/222,066 filed Jun. 30, 2009, from U.S. Provisional Patent Application No. 61/222,070 filed Jun. 30, 2009, and from U.S. Provisional Patent Application No. 61/244,840 filed Sep. 22, 2009, which applications are expressly incorporated by reference herein and for all purposes.

BACKGROUND OF THE INVENTION

1. Field of the Invention

The present invention relates generally to well cleaning systems and more particularly to in-well cleaning apparatus.

2. Description of Related Art

Sewage systems are in wide spread use for the removal of liquid waste from houses, factories and agricultural sites. The sewage flows through pipes into intermediate wells and finally into treatment plants or waste dumps. Electric pumps are usually used to maintain the flow and keep the wells below maximum capacity. These pumps are configured to operate when the level in the wells reaches a preset limit indicating that the flow needs pumping.

When the well level falls to a minimum level the pump is switched off and this level may be maintained for some time leaving a biofilm residue on the walls of the well between the maximum and minimum levels. This residue tends to harden and build up thus reducing the capacity of the well, and increasing the frequency of the pump operation.

Wastewater collection and treatment systems are a source of bad odors, the most prevalent coming from Hydrogen Sulphide, a toxic and corrosive gas with a characteristic rotten-egg smell. This is a bacterially mediated process that occurs in the submerged portion of sanitary sewerage systems. It begins with the establishment of a slime layer below the water level, composed of bacteria and other inert solids held together by a biologically secreted protein "glue" or biofilm called zooglea. When this biofilm becomes thick enough to prevent the diffusion of dissolved oxygen, an anoxic zone develops under the surface.

Hydrogen Sulphide is also a precursor to the formation of Sulphuric Acid, which causes the destruction of metal and concrete substrates and appurtenances within wastewater facilities and collection stations. The effect of biogenic sulfide corrosion and the formation of a 7% Sulphuric Acid solution on concrete surfaces exposed to the sewer environment are devastating. Entire pump stations and manholes and large sections of collection interceptors have collapsed due to the loss of structural integrity in the concrete. Accordingly the residue must be cleaned off the well walls and removed from the surface of the sewer water periodically to maintain the system in good working order as well as protecting concrete structures against the biogenic sulfide corrosion in wastewater collection and treatment systems so as to met the structure's anticipated design life as well as protecting the surrounding ground level infrastructure and environment.

BRIEF SUMMARY OF THE INVENTION

Certain embodiments of the present invention comprise systems and methods for which overcome or at least significantly reduce problems relating to the cleaning of wells by prior art systems. In particular the present invention employs spray nozzles and a submerged pumping system which allows the apparatus to use the sewage in the well to clean the walls causing aeration of the introduced effluent, hydrating the grease, oils, fats that contribute to biofilm so that it can be easily transported, via the sewer system to treatment plant for treatment. Systems and apparatus according to certain aspects of the invention can use a liquid stream containing solid materials which prior art apparatus has not achieved. Apparatus may be provided at well openings, removing the need for confined space entry. In certain embodiments, apparatus can be easily repositioned from the well entry point to allow access to the well to facilitate maintenance.

Certain embodiments of the invention provide apparatus that comprises a mixer having an inner chamber, an inlet and a plurality of outlets and one or more deflectors attached to associated outlets. In some of these embodiments, each deflector directs a fluid received from its associated outlet to a surface within a well. In some of these embodiments, the mixer receives a pressurized, unfiltered flow of fluid at the inlet and splits the supply of fluid between the outlets.

In certain embodiments, the inner chamber includes an impact surface located opposite the inlet, the impact surface redirecting the flow of fluid proportionately to the outlets. In some of these embodiments, the impact surface is curved and has an apex opposite the inlet. In some of these embodiments, the radius of curvature is selected to minimize eddies in the flow of fluid. In some of these embodiments, the radius of curvature is selected to obtain uniformity of fluid pressure throughout the inner chamber. In some of these embodiments, the radius of curvature is selected to obtain a desired distribution of fluid pressure throughout the inner chamber.

In some of these embodiments, the deflectors generate a force from the fluid flow that includes rotational and/or translational components sufficient to cause rotation about a first axis and/or translation along a second axis. The first and second axes can be the same axis or related axes. In some of these embodiments, the magnitudes of the forces are controlled by an angle at which the deflector is attached to its associated outlet. In some of these embodiments, the magnitude of the force is controlled to obtain a speed of rotation of the apparatus. In some of these embodiments, the magnitude of the force is controlled using a spring. In some of these embodiments, the magnitude of the force is controlled using aerodynamic members attached to one of the deflectors. In some of these embodiments, the magnitude of the force is controlled using aerodynamic members attached to the mixer. In some of these embodiments, the magnitude of the force is controlled using hydrodynamic members attached to one of the deflectors. In some of these embodiments, the magnitude of the force is controlled using hydrodynamic members attached to one of the deflectors.

Certain embodiments of the invention provide a spray head assembly for mounting in a pumping station. Some of these embodiments comprise a hydrodynamic mixing chamber configured to create turbulence in a fluid received from a pump. In some of these embodiments, the pump draws a fluid from a well of the pumping station. In some of these embodiments, provides a pressurized stream of the fluid to a pipe. Some of these embodiments comprise a nozzle associated with an outlet of the mixing chamber. In some of these embodiments, the nozzle receives the mixed fluid from the hydrodynamic mixing chamber. In some of these embodiments, the nozzle disperses the mixed fluid to the surface of a body of the fluid in the well.

In some of these embodiments, the nozzle provides a spray of the mixed fluid. In some of these embodiments, the hydrodynamic mixing chamber further comprises one or more deflectors. In some of these embodiments, each deflector receiving the spray from a corresponding nozzle. In some of these embodiments, each deflector directs a fluid received from its associated outlet to a surface within a well. In some of these embodiments, the deflectors generate a rotational force causing the nozzle to rotate around an axis of the spray head assembly. In some of these embodiments, the mixing chamber causes solids in the fluid received from a pump to impact a wall of the mixing chamber, thereby reducing the size of solids in the body of fluid. In some of these embodiments, the nozzle is stationary and the pump is a grinding pump that reduces solids in body of fluid to a slurry in the output of the pump. In some of these embodiments, the fluid includes solids. In some of these embodiments, the solids comprise bio-solids.

Some of these embodiments comprise a piped manifold system configured to combine liquid ozone with the fluid received from the pump. Some of these embodiments comprise a piped manifold system provide liquid ozone to the mixing chamber. In some of these embodiments, the mixing chamber mixes ozone with the fluid received from the pump. Some of these embodiments comprise a piped manifold system provide an additive to the mixing chamber. In some of these embodiments, the mixing chamber mixes the additive with the fluid received from the pump. In some of these embodiments, the additive comprises an organic compound. In some of these embodiments, the additive comprises a bio-augmentation product that operates to enhance breakdown of one or more of fat, oil, grease and bio-film. In some of these embodiments, the additive comprises one or more of a detergent and an oxidizer. In some of these embodiments, the additive an organism that effects biological breakdown of one or more of fat, oil, grease and bio-film. In some of these embodiments, the pipe is a forced main.

Certain embodiments of the invention provide a lift station, comprising a pump configured to draw a fluid from a well and to provide a pressurized stream of the fluid to a pipe. Certain embodiments of the invention provide a grinder station comprising a grinding pump configured to draw a fluid from a well, to grind solids in the fluid to obtain a slurry and to provide a pressurized stream of the slurry to a pipe. Some of these embodiments comprise a spray head assembly that has a hydrodynamic mixing chamber configured to receive a portion of the slurry stream from a tap on the pipe and to create turbulence in the portion of the slurry stream. Some of these embodiments comprise a nozzle associated with an outlet of the mixing chamber. In some of these embodiments, the nozzle receives a mixed fluid from the hydrodynamic mixing chamber and disperses the mixed fluid to the surface of a body of the fluid in the well. In some of these embodiments, the mixed fluid is oxygenated by the mixing chamber. In some of these embodiments, the nozzle provides a spray of the mixed fluid to one or more of a wall of the well and the surface of a body of the fluid in the well. Some of these embodiments comprise a manifold system provide an additive to the mixing chamber, wherein the mixing chamber mixes the additive with slurry received from the pump and wherein the additive comprises at least one of ozone, an organic compound, a detergent and an oxidizer.

BRIEF DESCRIPTION OF THE DRAWINGS

FIG. 9 is a table of specifications associated with certain embodiments of the invention.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Embodiments of the present invention can be deployed in well cleaning apparatus in order to improve the efficiency and effectiveness of such equipment. For the purposes of this description, an example of well cleaning apparatus will be used that bears certain similarities to apparatus described in the application filed under the patent cooperation treaty and numbered PCT/AU2007/001083 (and incorporated by reference herein in its entirety). Certain embodiments of the present invention can be used to retrofit conventional well cleaning apparatus but it will be appreciated that certain components of well cleaning equipment may be adapted and/or reconfigured to maximize the advantages accrued from the present invention. In some embodiments, for example, pump operating characteristics may be loosened because spray assemblies according to certain aspects of the invention can disperse accretions of solids deposited during variations in pump output. PCT application No. PCT/AU2007/001083 is incorporated by reference herein in its entirety.

Figure 1:
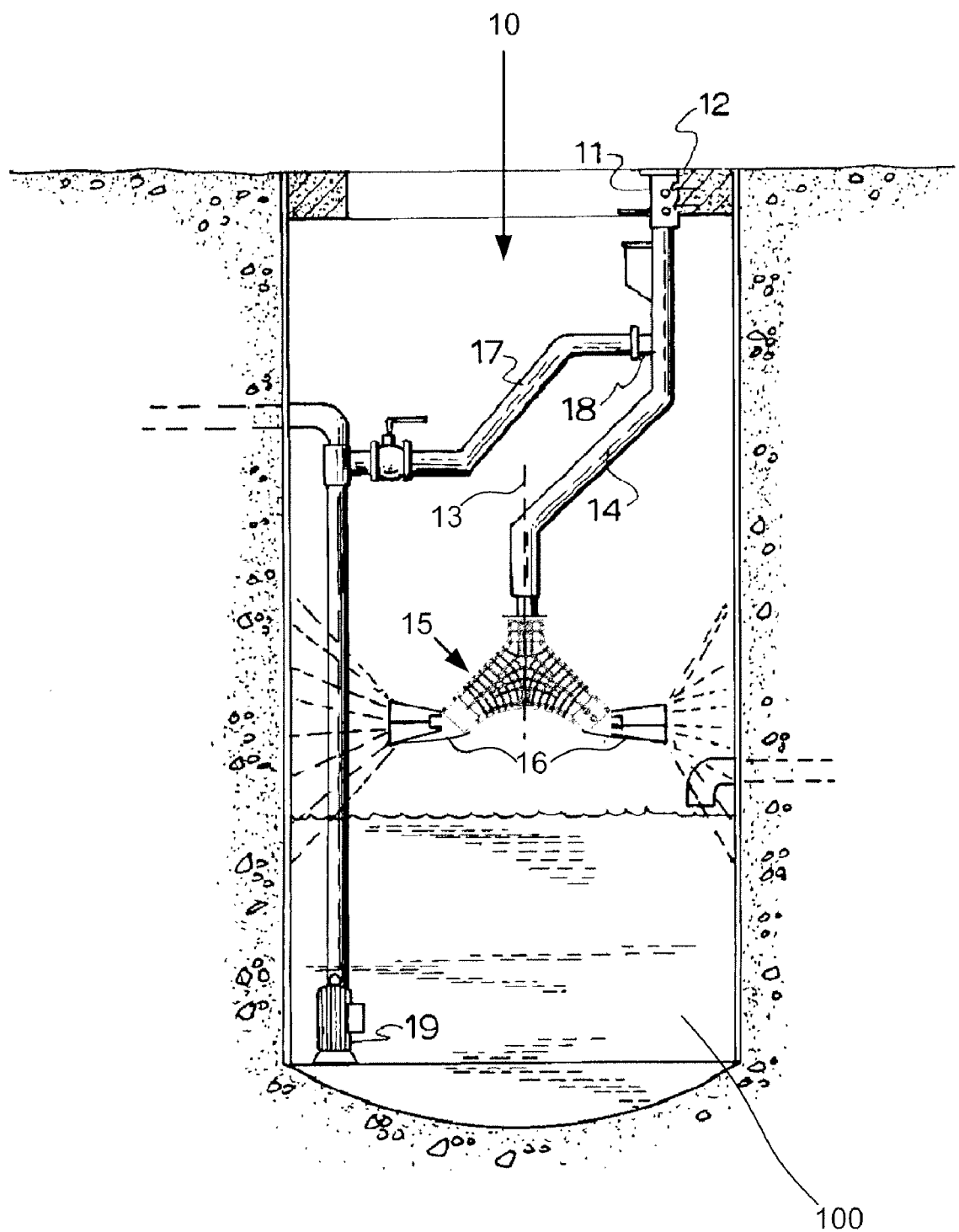
FIG. 1 is an elevation depicting an example of the presently claimed apparatus deployed within a well.

As depicted in FIG. 1, a well cleaning apparatus according to certain aspects of the invention can be mounted on, or suspended from a frame or bracket 11 typically attached by fasteners 12 at the top of well, tank, drum, vault or other container 10. For the purpose of description, the terms well, tank, drum, vault, sump or other container will be used henceforth interchangeably; "well 10" will be commonly used to describe any such container. Fluid is transmitted through a pipe or hose 17 to a conduit 14 and from there to spray assembly 15 which directs jets of fluid using deflectors 16 of spray assembly 15. In certain embodiments, spray assembly 15 is rotatably mounted to conduit 14 such that spray assembly 15 may rotate around axis of rotation 13 in order to obtain rotating water jets. Rotation is typically driven by force of water pressure. In operation, jets may provide a spray to the walls of the well 10, the surface of liquids 100 in the well 10 or tank and other equipment located within the well 10. The hose or pipe 17 is typically coupled to the conduit at coupling 18 and the fluid provided for cleaning can be obtained from an external source of water or derived from effluent pumped from the well by a submersible or other pump 19. It will be appreciated that, in conventional systems, pump 19, conduit 14, coupling 18 and jets may be subject to clogging, even where the system and its components are designed to pass anticipated solids such as, for example, solids up to 50 mm in diameter and 90 mm long found in a sewage stream.

Figure 2:
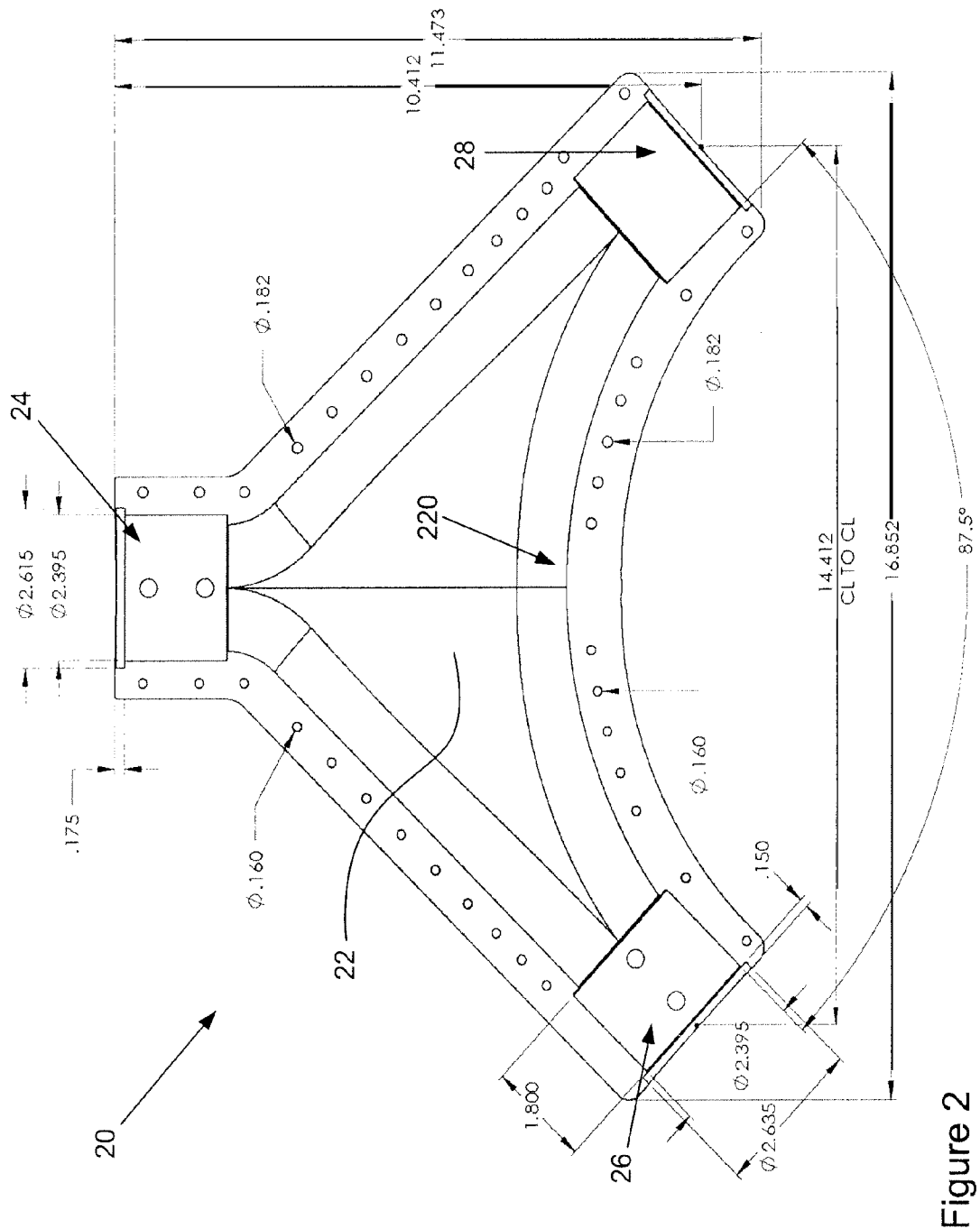
FIG. 2 shows a cross-sectional view of a mixer according to certain aspects of the invention.
Figure 3:
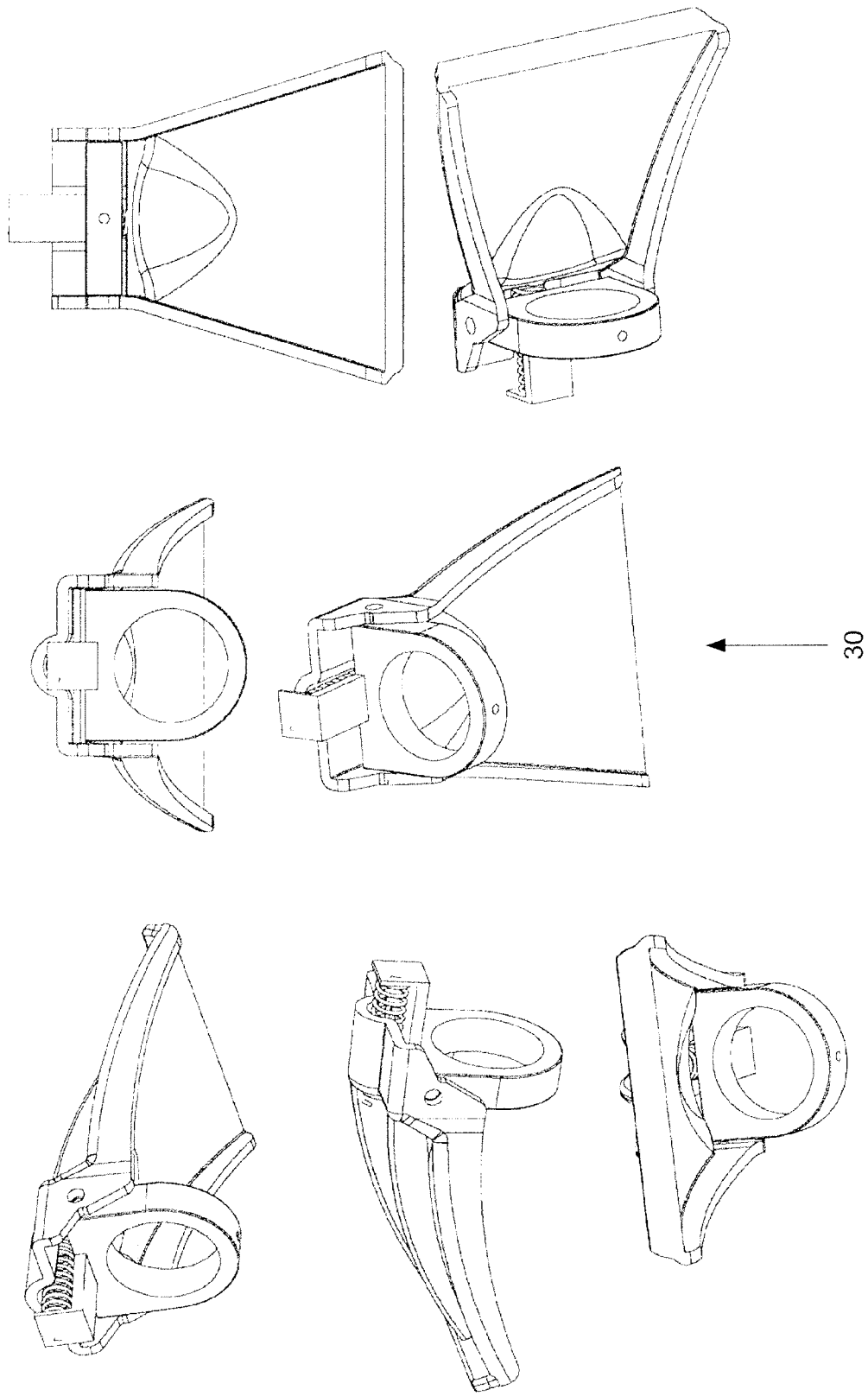
FIG. 3 shows variously angled views of a deflector vane according to certain aspects of the invention.

Certain embodiments of the present invention provide a spray assembly 15 for use in an automatic well washer that can reduce and/or eliminate the occurrence of blockage from accumulation of solid matter in a fluid stream used to wash the well, vault or tank. Referring to FIGS. 2 and 3, a spray assembly according to certain aspects of the invention typically comprises a mixer 20 and one or more deflectors 30 that cooperate to direct a flow of fluid to spray to the walls of the well 10, the surface of liquid 19 in the well 10 and other equipment located within the well 10. Mixer 20 is configured to optimize, control and generate flows and currents that prevent buildup of solid materials in an interior chamber 22 of mixer 20 and on the deflectors 30. Deflectors 30 are typically used to direct the flow of fluid to a target area for cleaning and may be angled or tilted in a manner that causes the spray head to rotate.

In conventional systems, eddy currents may create areas of low pressure within a spray head and variations in pressure may be observed during a pumping cycle, or when a flow fluid or liquid through the system and/or when a pump ceases operation. In response to such variations, conventional equipment may become progressively clogged as solids settle at junctions or distributors (e.g. in a tee piece), in small diameter pipe lines, fittings, bends, elbows, valves and areas of low pressure. Clogging can lead to partial or complete obstruction of the system. However, a mixing chamber constructed according to certain aspects of the invention avoids the potential for obstruction.

Certain embodiments provide a spray assembly 15 that includes mixer 20 having specifically engineered curves calculated to provide clog free operation of washer head using un-filtered stream of sewer water, storm water or the like. The example of FIG. 2 shows one embodiment where dimensions are typical for use in many sewage applications. Radii of curvature, cross-sectional diameters and other dimensions are selected based on parameters attributable to the application, including range of viscosity of the fluid, maximum and minimum size of solids, pressure developed by pump 19 and operating temperatures. Fluid flowing into chamber 22 from inlet 24 is directed to outlets 26 and 28. An impact surface 220 defined generally opposite the inlet is constructed to minimize undesired reflections and resultant waves, eddies and vortices in the fluid. Thus, the fluid flows through chamber 22 relatively smoothly. In some embodiments, the fluid can be caused to swirl, rotate or be otherwise agitated as desired.

In particular, the structure, location and dimensions of certain curved sections are calculated to enable free flow of un-filtered liquids. Fluid entering a first orifice 24, which serves as an inlet, passes to interior chamber 22 where the flow splits and exits the interior chamber 22 through other orifices 26 and 28 that serve as outlets to vent the liquid. The shape and dimensions of interior chamber 22 are selected to cause deposits of solids and bio-solids to be rolled and circulated into the liquid passing through the interior chamber 22. Solids and bio-solids are then pushed by the liquid flow liquid out of outlets 26 and 28.

In certain embodiments, mixer 20 can cause liquid to flow around solids and otherwise apply pressure to solids which have previously settled within interior chamber 22, including settlements occurring due to end of a pump cycle or during periods of low fluid flow. The structure of interior chamber 22 can create an agitation that causes accumulated solids and/or bio-solids to be lifted and circulated and eventually carried through outlets 26 and 28.

FIG. 3 depicts various views of a deflector 30 that can be used in conjunction with spray assembly 15. One or more deflectors 30 can be attached to mixer 20. In certain embodiments, deflector 30 is designed to respond to hydrodynamic forces created by the liquid as it is expelled through outlets 46 and 48. As the fluid passes over surfaces of the deflector 30, it may exert direct pressure on the surfaces of deflector 30 and/or generate aerodynamic or hydrodynamic pressure differences that cause the desired rotation. Thus, the volume and pressure of the liquid forced out of the mixer 20 can be used to cause and control rotation of the spray assembly. Rotation typically occurs when deflector 30 is suitably angled with respect to the outflow from outlets 26 and 28 and with respect to an axis of rotation 13 of the spray assembly. Thus, deflector 30 may have a "park" angle at which deflector 30 causes no rotational motion.

In certain embodiments, speed of rotation can be controlled by configuration and position of deflectors 30. A desired speed of rotation can be selected in this manner. Typically the angle of deflector 30 relative to an axis of rotation 13 of the spray assembly is selected to control speed of rotation. Speed of rotation may be automatically controlled to limit rotation to the desired speed of rotation by varying the angle and position of deflectors based on current speed of rotation. In particular, angle and/or position of deflectors 30 may be automatically adjusted in response to changes in pressure and volume of liquid passing through the outlets 26 and 28 of mixer 20. Consequently, the disclosed system may accommodate a broad range of pumps 19 and modes of operation of those pumps 19. For example, the system may accommodate a pump 19 driven at different rates selected to obtain different throughputs.

In certain embodiments, a pre-tensioned spring system can be used to control angle and or position of deflectors 30 based on actual speed of rotation. Such control can reduce liquid dispersal to a "ribbon action" and can prevent aerosol action and/or misting that can cause release of $H_2S$ and other undesired gas components. In some embodiments, speed of rotation may be automatically controlled using aerodynamic or hydrodynamic elements attached to the deflector and/or mixer 20, whereby the additional elements generate a force resistant to rotation proportional to the speed of rotation of spray assembly 15.

In certain embodiments, spray assembly 15 may be free to translate along the axis of rotation under the force of the outflow from outlets 26 and 28. Additional mechanisms may adjust the angle and direction of the deflector 30 after translation a predetermined distance, causing a reversal in direction and resulting in an oscillation of the spray assembly 15 that increases the area treated by the system. In certain embodiments the form, size and angle of the deflectors 30 can be used to control surface area of spray coverage.

The spray assembly 15 may be operated in applications where full-size solids are required to pass through freely without obstruction and clogging at various volumes and pressures. Full-size solids include solids that can pass through an inlet orifice having a predetermined diameter.

In certain embodiments, liquids containing solids and/or bio-solids passing through mixer 20 are typically agitated, oxygenated and homogenized. Moreover, a surface of a liquid contained by the well may be agitated, oxygenated and homogenized by the action of spray assembly 15. In addition to agitation, oxygenation and homogenization substances such as fat, oil, grease and bio-film present on the surface of the liquid in the well may be solubilized.

In certain embodiments, mixer 20 can be sized to accommodate other outflows without fixing a new mixing chamber by simply attaching flow reducers to outlet orifices.

Figure 4:
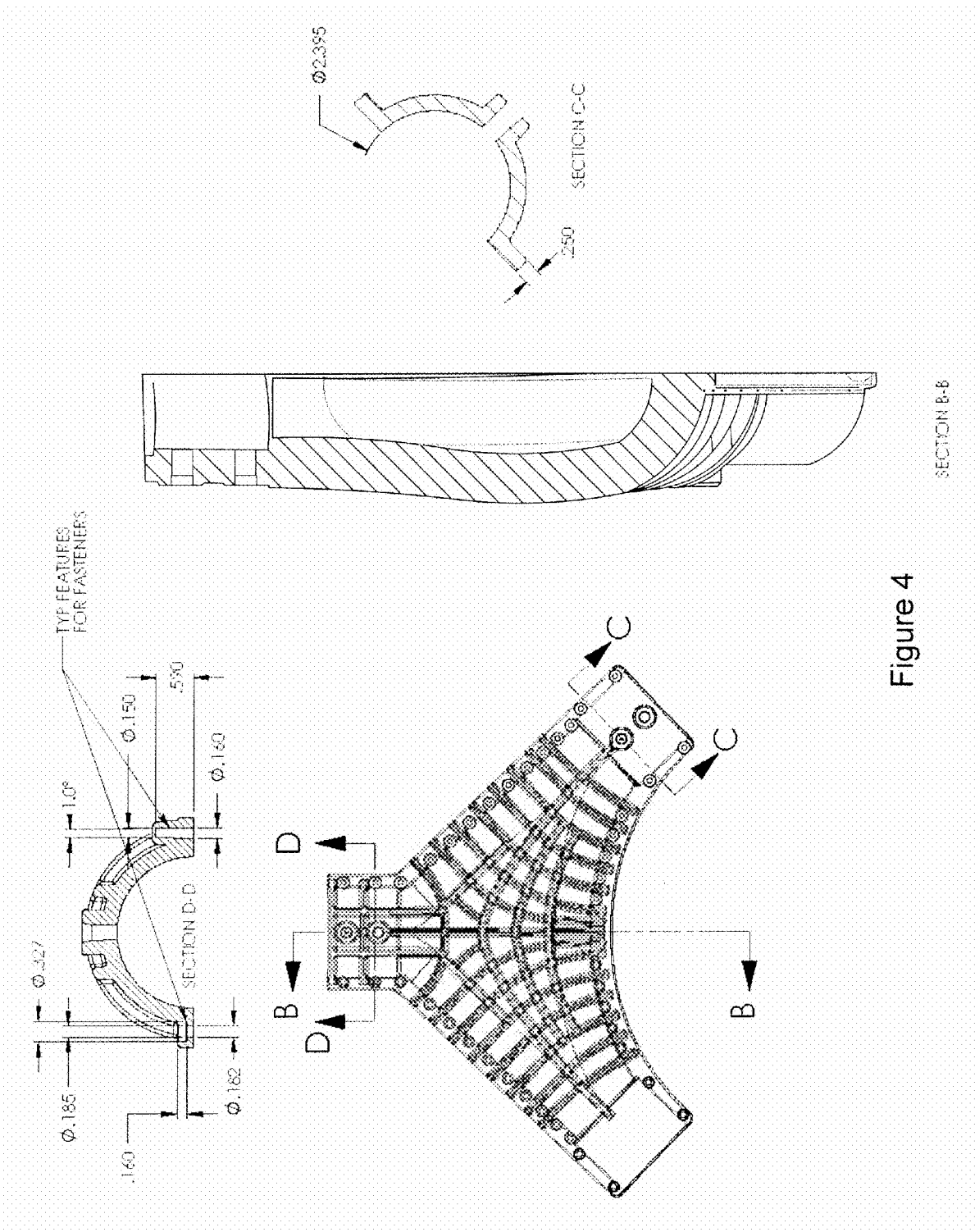
FIG. 4 is a detailed view of a mixer.
Figure 5:
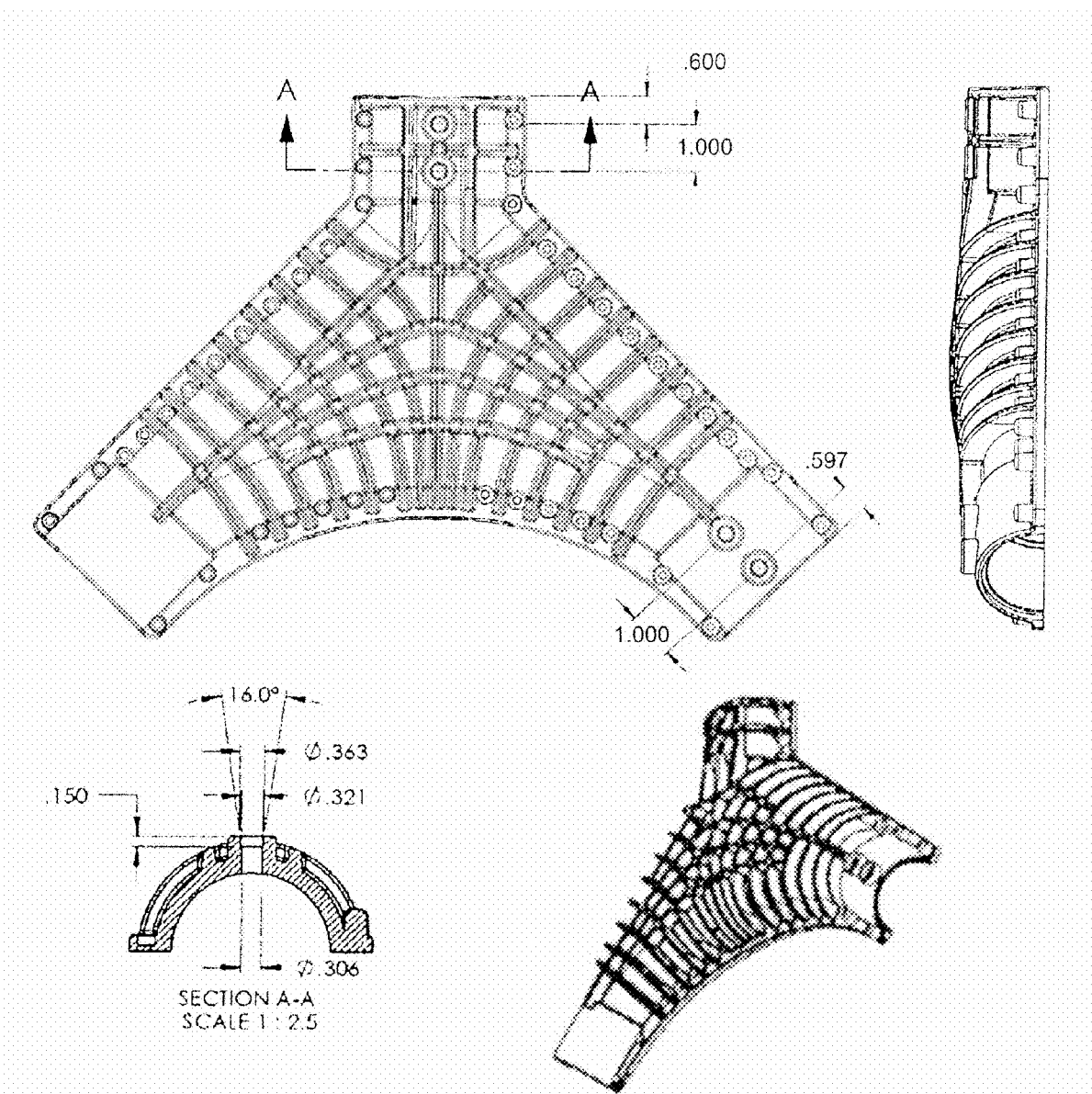
FIG. 5 is a detailed view of a mixer.

FIGS. 4 and 5 are engineering drawings showing detailed design information associated with one example of a spray assembly 15 according to certain aspects of the invention.

Pumping Station

Figure 6:
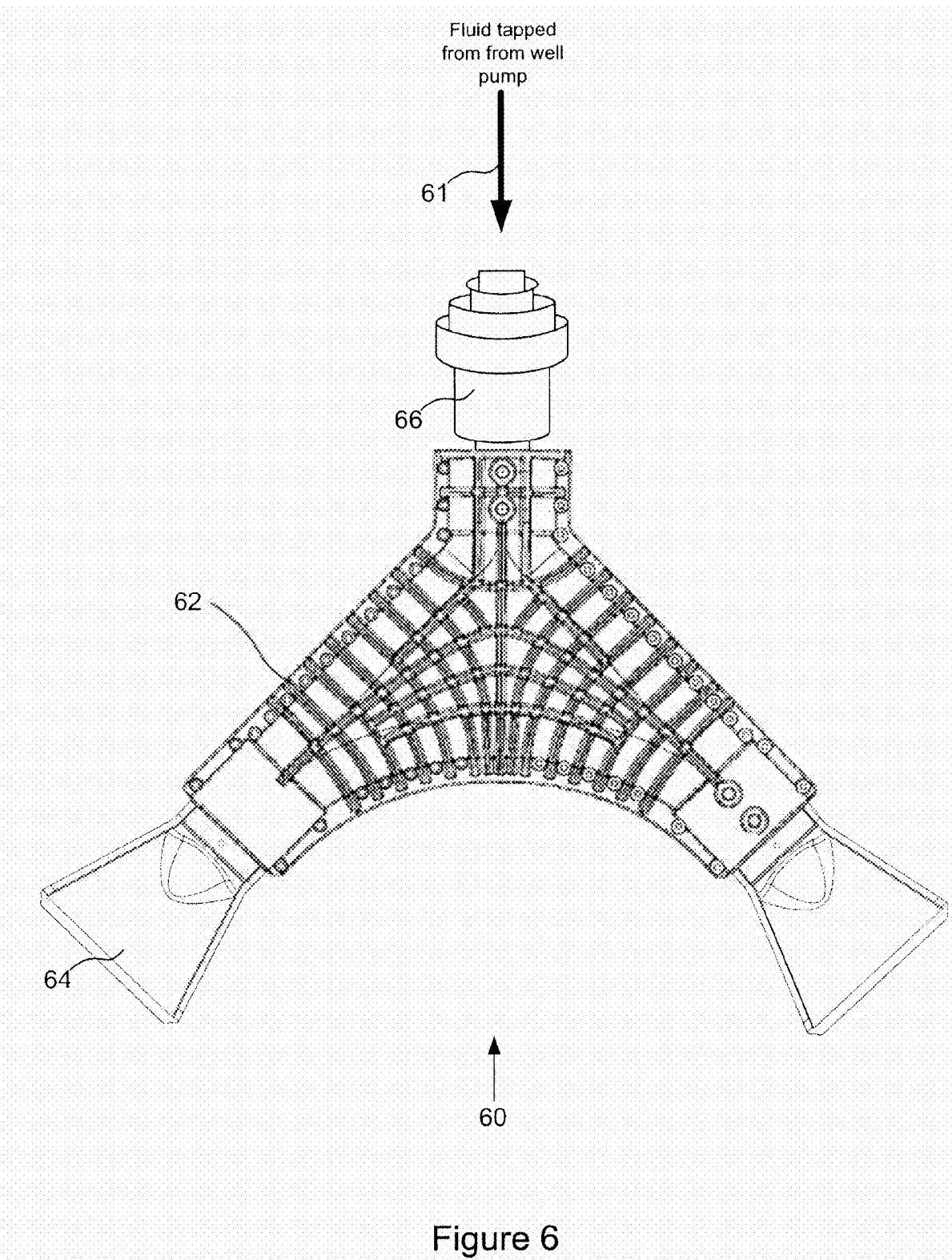
FIG. 6 shows a spray assembly according to certain aspects of the invention.

Certain embodiments of the invention can be adapted for fitting into pumping stations, which are also known as "lift stations." Pumping stations in sewage collection systems are typically adapted to handle gravity-fed raw sewage received from pipelines. Sewage can be stored in a wet well that includes a pump that drives (lifts) the sewage upward through a sewer force main. According to certain aspects of the invention, spray assembly 62 (FIG. 6) can be installed in pumping stations to obtain mechanical wastewater conditioning and cleaning that can keep lift stations free of organic and biological build-up. Lift station wastewater conditioning typically occurs through an ongoing process of surface agitation that prevents biofilm build-up. Additionally oxygenation and homogenization can promote aerobic activity with the effluent flow quality becoming consistent and predictable. A fractional amount of discharged flow can be recycled back into the well, resulting in a self-sustaining, "green" solution that enhances aerobic activity and automates well structure cleaning.

Figure 7:
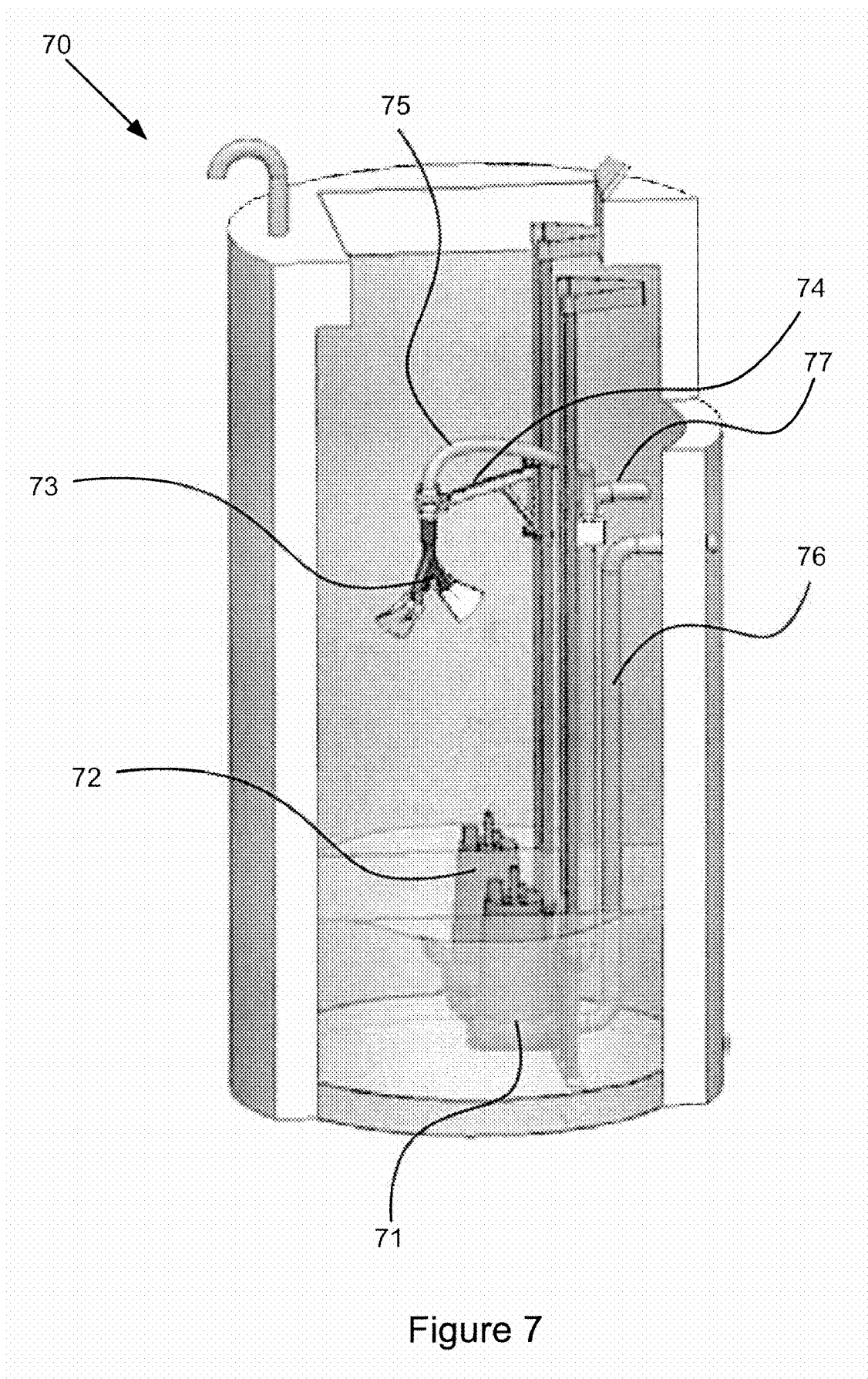
FIG. 7 shows a well having deployed therein, a spray assembly according to certain aspects of the invention.
Figure 8:
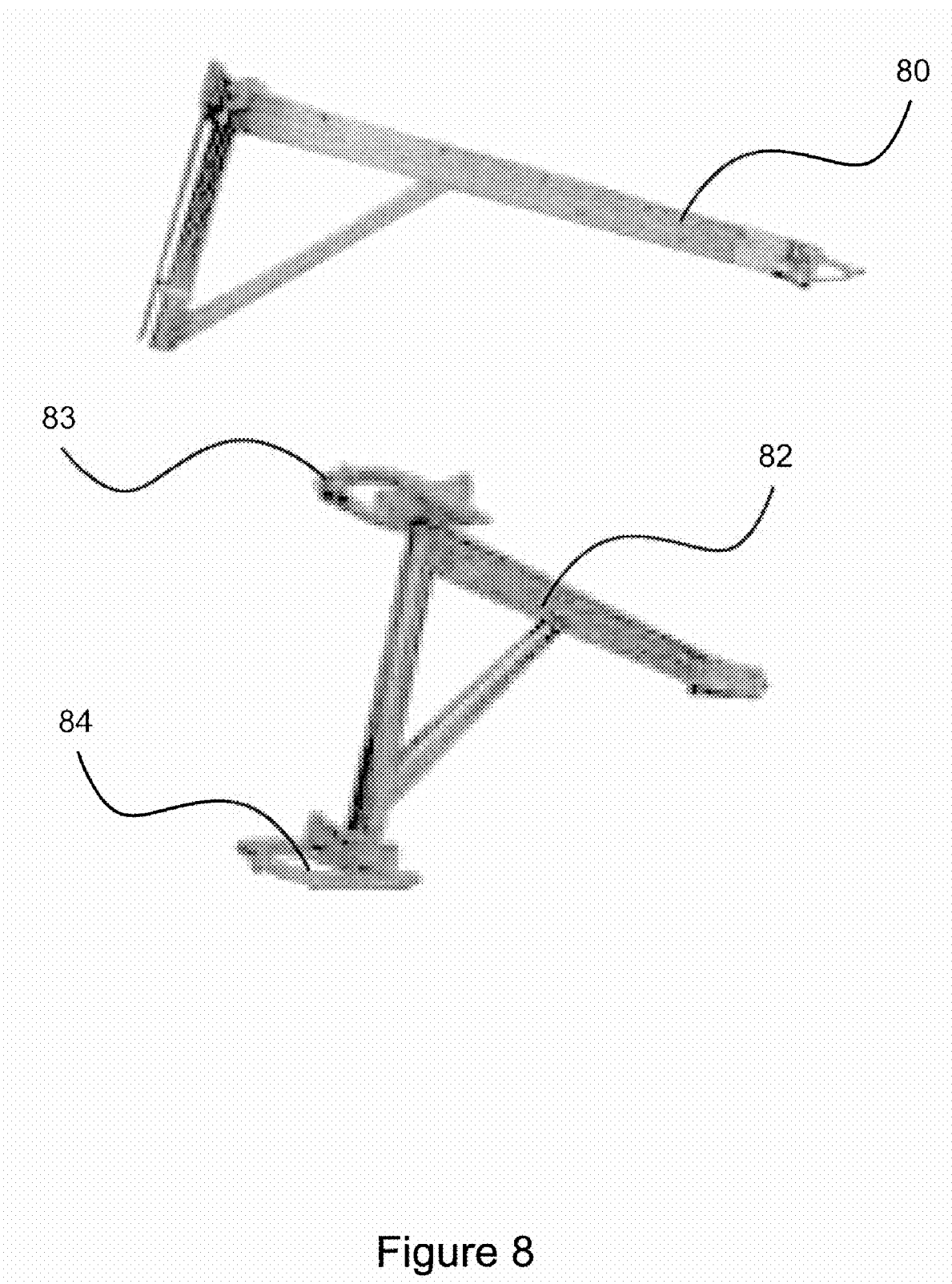
FIG. 8 depicts mounting brackets used for mounting a spray assembly according to certain aspects of the invention.

FIG. 7 shows an example of a lift station 70 in which a spray assembly 73 is fitted using bracket 74. Bracket 74 is used in this example to mount the spray head assembly to a pipe. FIG. 8 shows two examples of brackets that can be used: bracket 80 is typically used to mount spray assembly to a wall and bracket 82 has loop fasteners 83 and 84 for attachment to a pipe, as shown in FIG. 7. Spray head 73 can deliver a spray, typically a ribbon spray, that breaks up and prevents build-up of organic and bio-organic matter that can include fat, oil, grease and biofilm on surface of well fluid 72. Fluid is pumped from the well using pumps 71 and 72 and a portion of the pumped fluid is typically extracted from a tap in a pipe 76 or 77 pressurized by the pump; this portion is directed to the spray head assembly 73 for mixing and spraying. As described above, spray head assembly 73 typically includes a mixing chamber that oxygenates fluids, thereby increasing oxygen levels in the well. In one example, wastewater mixed in spray assembly 73 has increased dissolved oxygen content that has been measured at 800% or more of the dissolved oxygen observed in conventional systems. Because a portion of the waste water is recycled, solids can be homogenized by agitation through the nozzle and by spraying. Solids having a smaller volume have increased surface area that, together with the increased dissolved oxygen content, promotes significant increases in aerobic activity.

In certain embodiments, the use of the described spray assembly 73 (and see FIG. 6) automates cleaning of the pumping station and reduces maintenance overhead by reducing or eliminating fat, oil, grease and biofilm accumulation. The spray head 73 may be rotated under the force of wastewater flowing through the pumping station. Accordingly, the cleaning mechanism can be powered by the pump already available within the pumping station. By recycling a fraction of discharge flow, wastewater can be reconditioned as the lift station is cleaned without the need for an additional external power supply. Moreover, clean water is not needed for regular wash down, improving the well conformance to environmental requirements.

Figure 10:
FIG. 10 shows a spray head according to certain aspects of the invention.

In certain embodiments, the rotary head assembly 73 may be selected from a plurality of different assembly types. The number of nozzles may vary and the spray head assembly may be stationary in small wells, producing a fixed spray pattern (see FIG. 10). However, some variants of the spray head assembly 73 may be differentiated by a diameter of the intake pipe which may be selected based on the intended application. In one example, a large diameter head assembly may be selected to handle wastewater having relatively large solids. Large diameter head assemblies having diameters of 1.5" (38 mm) and 2" (51 mm) are typically used in many common lift stations. Larger diameter head assemblies may be used to handle larger wastewater flows. Smaller diameter head assemblies may be used where solid content in fluids provided to the head assembly is minimized in size using a grinding pump or by providing filtered water. In one example, a 1" (25 mm) head assembly may be used with a grinding pump. In another example, a 0.75" (19 mm) head assembly may be used with a relatively clean and/or filtered supply. An example of operational characteristics and specifications for various head assemblies provided according to certain aspects of the invention is shown in FIG. 9.

Embodiments of the invention may be used in a variety of water applications, in lift stations, storm water vaults, and/or clarifiers. The rotary head assembly can be fitted with inserts that modify the flow rate. For example, a ¾" or 1" insert can lower flow requirements while providing superior oxygenation, surface agitation, and wash down action. Spray assembly may be mounted on the side of a well or hung from a top edge of the well and can be fed using piping or hoses from a pipe that is driven by the pump. In certain embodiments, the spray assembly can be mounted to one or more pipes including, for example, a pipe that carries fluid driven by a pump, from which pipe the spray assembly 62 (FIG. 6) is fed. It will be appreciated that the pump typically operates when accumulation of waste or other well content increases above a "high-water" threshold and ceases operation when the content falls below a "low-water" threshold. Accordingly, the system can operate intermittently or continuously according to the rate of flow into the well.

Grinder Station

Certain embodiments of the invention can be adapted for fitting into grinder pump stations. Grinder stations can grind solids in wastewater to form a slurry. It will be appreciated that grinder pumps can reduce clogging in the system. Accordingly, an alternative nozzle can be used in a spray assembly that is configured to handle smaller solids. A nozzle, such as hydro spear nozzle shown in FIG. 10, can comprise a mixing chamber and delivery system that delivers a ribboned stream of recycled wastewater. Mixing chamber may comprise a reduced size chamber that can promote agitation in order to oxygenate recycled wastewater and to introduce additional turbulence that mitigates obstruction. The resultant spray agitates the surface of the well wastewater, thereby breaking up accumulated fat, oil, grease and biofilm.

Increased oxygenation and further homogenization are promoted that breaks down solids further and mixes homogenized matter with air, bacteria and creates an even dispersal of the matter.

The spray nozzle assembly 73 in a smaller well or in a grinder station may be mounted on the side of a well or hung from a lid or top edge of the well but is typically mounted on a discharge pipe used to feed the spray assembly. The spray assembly is typically fed by tap on a pipe 76 and 77 that communicates fluids driven by a grinder pump (e.g. pump 71 or 72). The spray assembly 73 can operate automatically to clean the well based on the cyclic activity of the grinder pump 71 or 72. The pump typically turns on when accumulation of waste or other well content increases above a "high-water" threshold and turns off when the content falls below a "low-water" threshold. Accordingly, the system can operate intermittently or continuously according to the rate of flow into the well Materials Injection With reference also to FIG. 6, certain embodiments of the invention provide one or more input ports for feeding chemicals into the mixing chamber of head assemblies. Input ports may be provided at a tap point of pipe 76 or 77. Input port may be provided in a manifold 66 that receives flow 61 from a pump 71 or 72. Spray head assemblies 73 that are used in the currently described systems typically comprise a mixing chamber that receives fluid 61 from the pump and that mixes the fluid 61 with additives from manifold 66. The spray head assembly 73 may be mounted such that a portion rotates such that nozzles are repositioned or cycled. Rotation is typically powered by the force of pressure of fluid 61, and/or impact of fluids or solids on vanes provided in the interior of, or on the exterior of the head assembly 73. The mixing chamber is typically constructed to generate turbulence in the fluid, cause mixing and aeration that is applied to the surface of water in a well and/or to the walls of the well.

In certain embodiments, a selection of materials can be added to and mixed with wastewater through an import port or a plurality of input ports. The additives can be released according to a fixed schedule, by manual intervention of maintenance staff or in response to a control system configured to measure chemical and biomaterial content and/or buildup. Based on well conditions a variety of chemicals, organic compounds and/or bio-augmentation products may be mixed with the wastewater. Additives may be used to enhance breakdown of fat, oil, grease and bio-film. Additives may comprise a detergent, an oxidizer or other chemical selected to target and breakdown a material or group of materials. Additives may also comprise an organism added to effect biological breakdown of materials. Since certain additives may react with or interfere with other additives, different additives may be added at different times, typically to achieve different purposes.

In one example, certain embodiments of the invention pre-treat contaminated water that contains various levels of sulfide ($H_2S$), sulfite and sulfate into elemental sulfur that can be subsequently flushed from the system. The contaminants are oxidized to effect change of the aqueous sulfide ion and subsequent sulfur forms. In addition increased mixing and contact time of contaminated water to insoluble free sulfur, thereby eliminating or significantly reducing odors.

Certain embodiments employ a process of direct injection of concentrated ozone gas into a flowing stream of contaminated water through a mixing and dispersion system maintained in a well, container, pump station and/or tank, etc. for treating a body of contaminated water. Mixing and dispersion system can provide an oxidant onto the surface of the body of contaminated water through the delivery system in order to complete the oxidation of aqueous sulfur and to accomplish marginal ancillary disinfection.

A processing system can automatically detect levels of residual ozone in the body of water. In some embodiments, the processing system may detect presence or absence of other products and chemicals including contaminants. Processing systems may include one or more computer processors, storage, communication elements and may be coupled to sensors for detecting ozone or other chemicals. Dosage of ozone may be calculated based on rate of consumption of ozone, presence of excess ozone and other indicators that are related to sulfide levels. For example, a particular sulfide level can be neutralized by application of a specific dose of ozone and the rate of consumption can be used to indicate the sulfide level and rate of treatment required to maintain a desired residual ozone required for continuous or further treatment of the body of contaminated water in which the ozone is dispersed. Residual ozone can be measured by a dissolved ozone monitor with a single loop feedback to the ozone generator supply of oxygen, which may increase or decrease concentration to suit required residual need.

In certain embodiments, high concentrate ozone gas is pumped into a stainless steel piped manifold system that can be instantly mixed with contaminated water and further mixed within a stainless steel hydraulic hydrodynamic mixing chamber causing further oxidation. This treated contaminated water can in turn be dispersed in the head space over a set body of contained contaminated water ready for further dispersion, thereby allowing further oxidation by increased agitation causing an increase of dissolved oxygen. A suitable dispersion method is described in U.S. Provisional Patent Application No. 61/167,850.

Liquid Phase ozone odor control in-situ injection system can prevent by oxidization, bio-aerosols, and aerosols and or misting that can release $H_2S$ into the headspace of well and any other undesired gas components that can cause further release of $H_2SO_3$ or $H_2SO_4$. Systems and methods according to certain aspects of the invention can also deliver a powerful oxidant that can be adjusted to safely clean, decontaminate and purify wastewater. Accordingly, in certain embodiments, an ozone generator may be operated and controlled together with a well monitoring system such that the addition of ozone may be optimized according to application needs and ozone generator capabilities.

Methods Of Operation

In certain embodiments, fluids are treated using a spray assembly placed within a well. The fluids may include treatment of water, including waste water, well water, sewage, storm water, contaminated water, grey water, oil well brines, and so on. The fluid may include solid matter. The spray assembly may be fixed to a well, a cover of the well, a top edge of the well, the floor of the well of the well or mounted on one or more pipes or other fixtures located within the well.

A process for treating the fluid comprises providing a portion of the fluid to the spray assembly. Typically, the portion of the fluid is provided using a pump used to evacuate fluid when the fluid content of the well exceeds a threshold level. The portion of fluid can be diverted through a tap on a pipe pressurized by the pump. The pump may be a grinding pump used to grind the solid matter, thereby reducing the size of solids in the fluid. The process also includes a step of introducing the fluid to a mixing chamber that introduces turbulence to the fluid. The turbulence typically aerates and/or oxygenates the fluid. Materials can be added to the fluid prior to its entry into the mixing chamber. The materials are added through one or more input ports.

In certain embodiments, the mixing chamber has a curved inner surface which receives the forces of the fluids entering the mixing chamber. The form of the curved surface is selected to minimize clogging and/or adherence of solid matter. Solid matter striking the curved surface is subjected to a force that tends to break apart the solids. The mixing chamber typically provides an output of homogenized, oxygenated fluid to one or more nozzle.

In certain embodiments, the process includes driving the homogenized, oxygenated fluid through the one or more nozzle to obtain a spray. The spray may be a ribbon spray. The process may also include selectively directing the spray to the surface of fluid remaining in the well. The process may also include selectively directing the spray to a wall of the well. The process may also include selectively directing the spray to fittings within the well, where the fittings can include piping, pumps, ladders, and so on. The spray may deliver one or more of the added materials to the fluid of the well, the wall of the well and to other elements of the well.

In some embodiments, the added materials can be released according to a fixed schedule. In some embodiments, the added materials can be released by manual intervention of a person. In some embodiments, the added materials can be released in response to a control system configured to measure chemical and biomaterial content and/or buildup. The added materials may comprise one or more of a chemical, an organic compound and bio-augmentation products. The added materials enhance breakdown of one or more materials that can include fat, oil, grease and bio-film. The added materials may comprise a detergent, an oxidizer or other chemical selected to target and breakdown a material or group of materials and may further comprise an organism added to effect biological breakdown of materials.

In certain embodiments, the process includes causing the spray to cyclically treat portions of the well. In some embodiments, cyclically treating includes causing a portion of the spray assembly to rotate. Causing a portion of the spray assembly to rotate may include providing a portion of the spray to one or more vanes that, through hydrodynamic action cause a portion of the spray assembly to rotate around a rotatable joint. In some embodiments, cyclically treating includes cycling the pump such that washing occurs at intervals of time. The intervals of time may coincide with cycles of pumping fluids from the well through a force main. The intervals may be calculated by a control system.

ADDITIONAL DESCRIPTIONS OF CERTAIN ASPECTS OF THE INVENTION

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide a spray apparatus that may be used in cleaning wells. The apparatus typically comprises a mixer having an inner chamber, an inlet and a plurality of outlets and one or more deflectors attached to associated outlets. In some of these embodiments, each deflector directs a fluid received from its associated outlet to a surface within a well. In some of these embodiments, the mixer receives a pressurized, unfiltered flow of fluid at the inlet and splits the supply of fluid between the outlets.

In some of these embodiments, the inner chamber includes an impact surface located opposite the inlet, the impact surface redirecting the flow of fluid proportionately to the outlets. In some of these embodiments, the impact surface is curved and has an apex opposite the inlet. In some of these embodiments, the radius of curvature is selected to minimize eddies in the flow of fluid. In some of these embodiments, the radius of curvature is selected to obtain uniformity of fluid pressure throughout the inner chamber. In some of these embodiments, the radius of curvature is selected to obtain a desired distribution of fluid pressure throughout the inner chamber. In some of these embodiments, the fluid includes solids. In some of these embodiments, the solids comprise bio-solids. In some of these embodiments, the desired distribution of fluid pressure is sufficient to dislodge solids accumulated solids in the inner chamber.

In some of these embodiments, wherein the deflectors generate a force from the fluid flow. In some of these embodiments, the force includes a rotational component sufficient to cause rotation of the apparatus. In some of these embodiments, the magnitude of the force is controlled by an angle at which the deflector is attached to its associated outlet. In some of these embodiments, the magnitude of the force is controlled to obtain a speed of rotation of the apparatus. In some of these embodiments, the magnitude of the force is controlled using a spring. In some of these embodiments, the magnitude of the force is controlled using aerodynamic members attached to one of the deflectors. In some of these embodiments, the magnitude of the force is controlled using aerodynamic members attached to the mixer. In some of these embodiments, the magnitude of the force is controlled using hydrodynamic members attached to one of the deflectors. In some of these embodiments, the magnitude of the force is controlled using hydrodynamic members attached to one of the deflectors.

In some of these embodiments, the force includes a translational component sufficient to translate the apparatus in a direction generally perpendicular fluid exiting the outlets. In some of these embodiments, the apparatus oscillates along the direction generally perpendicular fluid exiting the outlets.

Certain embodiments of the invention provide a spray head assembly for mounting in a pumping station. Some of these embodiments comprise a hydrodynamic mixing chamber configured to create turbulence in a fluid received from a pump. In some of these embodiments, the pump draws a fluid from a well of the pumping station. In some of these embodiments, provides a pressurized stream of the fluid to a pipe. Some of these embodiments comprise a nozzle associated with an outlet of the mixing chamber. In some of these embodiments, the nozzle receives the mixed fluid from the hydrodynamic mixing chamber. In some of these embodiments, the nozzle disperses the mixed fluid to the surface of a body of the fluid in the well.

In some of these embodiments, the nozzle provides a spray of the mixed fluid. In some of these embodiments, the hydrodynamic mixing chamber further comprises one or more deflectors. In some of these embodiments, each deflector receiving the spray from a corresponding nozzle. In some of these embodiments, each deflector directs a fluid received from its associated outlet to a surface within a well. In some of these embodiments, the deflectors generate a rotational force causing the nozzle to rotate around an axis of the spray head assembly. In some of these embodiments, the mixing chamber causes solids in the fluid received from a pump to impact a wall of the mixing chamber, thereby reducing the size of solids in the body of fluid. In some of these embodiments, the nozzle is stationary and the pump is a grinding pump that reduces solids in body of fluid to a slurry in the output of the pump. In some of these embodiments, the fluid includes solids. In some of these embodiments, the solids comprise bio-solids.

Some of these embodiments comprise a piped manifold system configured to combine liquid ozone with the fluid received from the pump. Some of these embodiments comprise a piped manifold system provide liquid ozone to the mixing chamber. In some of these embodiments, the mixing chamber mixes ozone with the fluid received from the pump. Some of these embodiments comprise a piped manifold system provide an additive to the mixing chamber. In some of these embodiments, the mixing chamber mixes the additive with the fluid received from the pump. In some of these embodiments, the additive comprises an organic compound. In some of these embodiments, the additive comprises a bio-augmentation product that operates to enhance breakdown of one or more of fat, oil, grease and bio-film. In some of these embodiments, the additive comprises one or more of a detergent and an oxidizer. In some of these embodiments, the additive an organism that effects biological breakdown of one or more of fat, oil, grease and bio-film. In some of these embodiments, the pipe is a forced main.

Certain embodiments of the invention provide a lift station, comprising a pump configured to draw a fluid from a well and to provide a pressurized stream of the fluid to a pipe. Some of these embodiments comprise a spray head assembly that has a hydrodynamic mixing chamber configured to receive a portion of the stream from a tap on the pipe and to create turbulence in the portion of the stream. Some of these embodiments comprise a nozzle associated with an outlet of the mixing chamber. In some of these embodiments, the nozzle receives a mixed fluid from the hydrodynamic mixing chamber and disperses the mixed fluid to the surface of a body of the fluid in the well. In some of these embodiments, the mixed fluid is homogenized and oxygenated by the mixing chamber. In some of these embodiments, the nozzle rotates around an axis of the spray head assembly and provides a spray of the mixed fluid to one or more of a wall of the well and the surface of a body of the fluid in the well. Some of these embodiments comprise a manifold system that provides an additive to the mixing chamber. In some of these embodiments, the mixing chamber mixes the additive with the fluid received from the pump. In some of these embodiments, the additive comprises at least one of ozone, an organic compound, a detergent and an oxidizer.

Certain embodiments of the invention provide a grinder station comprising a grinding pump configured to draw a fluid from a well, to grind solids in the fluid to obtain a slurry and to provide a pressurized stream of the slurry to a pipe. Some of these embodiments comprise a spray head assembly that has a hydrodynamic mixing chamber configured to receive a portion of the slurry stream from a tap on the pipe and to create turbulence in the portion of the slurry stream. Some of these embodiments comprise a nozzle associated with an outlet of the mixing chamber. In some of these embodiments, the nozzle receives a mixed fluid from the hydrodynamic mixing chamber and disperses the mixed fluid to the surface of a body of the fluid in the well. In some of these embodiments, the mixed fluid is oxygenated by the mixing chamber. In some of these embodiments, the nozzle provides a spray of the mixed fluid to one or more of a wall of the well and the surface of a body of the fluid in the well. Some of these embodiments comprise a manifold system provide an additive to the mixing chamber, wherein the mixing chamber mixes the additive with slurry received from the pump and wherein the additive comprises at least one of ozone, an organic compound, a detergent and an oxidizer.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A spray head assembly for mounting in a pumping station, comprising:
   a hydrodynamic mixing chamber configured to create turbulence in a fluid received from a pump, the pump drawing a fluid from a well of the pumping station and providing a pressurized stream of the fluid to a pipe;
   a nozzle associated with an outlet of the mixing chamber, the nozzle receiving the mixed fluid from the hydrodynamic mixing chamber and dispersing the mixed fluid to the surface of a body of the fluid in the well, wherein the nozzle provides a spray of the mixed fluid; and
   one or more deflectors, each deflector receiving the spray from a corresponding nozzle, wherein each deflector directs a fluid received from its associated outlet to a surface within the well,
   wherein the mixing chamber causes solids in the fluid received from the pump to impact a wall of the mixing chamber, thereby reducing the size of solids in the body of fluid.

2. The spray head assembly of claim 1, wherein the deflectors generate a rotational force causing the nozzle to rotate around an axis of the spray head assembly.

3. The spray head assembly of claim 1, wherein the nozzle is stationary and the pump is a grinding pump that reduces solids in body of fluid to a slurry in the output of the pump.

4. The spray head assembly of claim 1, wherein the fluid includes solids.

5. The spray head assembly of claim 4, wherein the solids comprise bio-solids.

6. The spray head assembly of claim 1, further comprising a piped manifold system configured to combine liquid ozone with the fluid received from the pump.

7. The spray head assembly of claim 1, further comprising a piped manifold system provide liquid ozone to the mixing chamber, wherein the mixing chamber mixes ozone with the fluid received from the pump.

8. The spray head assembly of claim 1, further comprising a piped manifold system that provides an additive to the mixing chamber, wherein the mixing chamber mixes the additive with the fluid received from the pump.

9. The spray head assembly of claim 8, wherein the additive comprises an organic compound.

10. The spray head assembly of claim 8, wherein the additive comprises a bio-augmentation product that operates to enhance breakdown of one or more of fat, oil, grease and bio-film.

11. The spray head assembly of claim 8, wherein the additive comprises one or more of a detergent and an oxidizer.

12. The spray head assembly of claim 8, wherein the additive an organism that effects biological breakdown of one or more of fat, oil, grease and bio-film.

13. The spray head assembly of claim 1, wherein the pipe is a forced main pipe.

14. A lift station, comprising:
a pump configured to draw a fluid from a well and to provide a pressurized stream of the fluid to a pipe; and
a spray head assembly that has a hydrodynamic mixing chamber configured to receive a portion of the stream from a tap on the pipe and to create turbulence in the portion of the stream, a nozzle associated with an outlet of the mixing chamber, the nozzle receiving a mixed fluid from the hydrodynamic mixing chamber and dispersing the mixed fluid to the surface of a body of the fluid in the well, and at least one deflector that receives the mixed fluid from the nozzle, wherein the deflector directs the mixed fluid to a surface within the well, wherein the mixed fluid is homogenized and oxygenated by the mixing chamber, and wherein the mixing chamber causes solids in the mixed fluid to impact a wall of the mixing chamber, thereby reducing the size of solids in the fluid in the well.

15. The lift station of claim 14, wherein the nozzle rotates around an axis of the spray head assembly and provides a spray of the mixed fluid to a wall of the well.

16. The lift station of claim 15, further comprising a manifold system that provides an additive to the mixing chamber, wherein the mixing chamber mixes the additive with the fluid received from the pump and wherein the additive comprises at least one of ozone, an organic compound, a detergent and an oxidizer.

17. A grinder station, comprising:
a grinding pump configured to draw a fluid from a well, to grind solids in the fluid to obtain a slurry and to provide a pressurized stream of the slurry to a pipe; and
a spray head assembly that has a hydrodynamic mixing chamber configured to receive a portion of the slurry stream from a tap on the pipe and to create turbulence in the portion of the slurry stream, a nozzle associated with an outlet of the mixing chamber, the nozzle receiving a mixed fluid from the hydrodynamic mixing chamber and dispersing the mixed fluid to the surface of a body of the fluid in the well, and at least one deflector that receives the mixed fluid from the nozzle, wherein the deflector directs the mixed fluid to a surface within the well, wherein the mixed fluid is oxygenated by the mixing chamber, wherein the nozzle provides a spray of the mixed fluid to one or more of a wall of the well and the surface of a body of the fluid in the well, and wherein the mixing chamber causes solids in the mixed fluid to impact a wall of the mixing chamber, thereby reducing the size of solids in the fluid in the well.

18. The grinder station of claim 17, further comprising a manifold system provide an additive to the mixing chamber, wherein the mixing chamber mixes the additive with slurry received from the pump and wherein the additive comprises at least one of ozone, an organic compound, a detergent and an oxidizer.

* * * * *